3,141,907
METHOD OF PREPARING BIOLOGICAL
ACTIVE SULFIDES
Victor Mark, Olivette, Mo., assignor to Monsanto
Company, a corporation of Delaware
No Drawing. Filed Oct. 19, 1961, Ser. No. 146,356
7 Claims. (Cl. 260—609)

This invention relates to new organic compounds which have useful biological properties. More specifically, the invention relates to derivatives of cyclopentadiene, which are valuable intermediates for the preparation of biologically active compounds as are hereinafter described.

The purpose of this invention is to provide a new class of biological active compounds and a simple, direct and economical method for their preparation from readily available raw materials.

The new compounds have the structure,

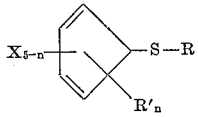

wherein X is selected from the group consisting of chlorine, bromine, fluorine, iodine, alkoxy radicals having up to twelve carbon atoms and radicals such that two substituents on adjacent unsaturated carbon atoms of the cyclopentadiene form cyclic radicals of four to six carbon atoms and said radicals containing substituents of the group consisting of chlorine, bromine, fluorine and iodine; $n$ is an integer from zero (0) to three (3); and wherein R and R' are organic radicals of the group consisting of hydrocarbon radicals having up to 20 carbon atoms selected from the group consisting of alkyl, alkenyl, alkynyl, cycloaliphatic, hydrocarbon substituted cycloaliphatic (particularly the alkyl substituted) aryl, hydrocarbon substituted aryl (particularly the aliphatic and araliphatic substituted aryl), araliphatic, hydrocarbon substituted araliphatic radicals (particularly the aliphatic substituted araliphatic radicals), and the said hydrocarbon radicals containing substituents of the group consisting of chlorine, bromine, fluorine, iodine, hydrocarbonoxy (particularly alkoxy, aryloxy and aralkoxy), nitro, cyano, thiocyano, isocyano, mercapto, hydroxyl, acyloxy, isothiocyano, acyl, hydrocarbonoxycarbonyl, hydrocarbonthio (particularly the alkylthio, arylthio and aralkylthio), amino, hydrocarbonamino, hydrocarbonsulfonyl, hydrocarbonsulfinyl radicals, the heterocyclic substituents, furyl, thiophenyl, pyridyl, piperidyl, morpholyl, tetrahydrofuryl, dihydrofuryl, tetrahydrothiophenyl and dihydrothiophenyl, the hydrocarbon and acyl groups of said substituents having up to 20 carbon atoms.

The new compounds are made by the inter-reaction of cyclopentadienes containing at least one halogen atom in the allylic position (on a carbon atom which is not adjacent a double bond) with a mercaptan.

Suitable cyclopentadienes are the halocyclopentadienes, such as:

hexachlorocyclopentadiene

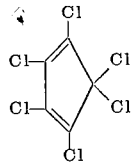

hexabromocyclopentadiene

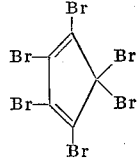

1,2,3,4-tetrachloro-5,5-difluorocyclopentadiene

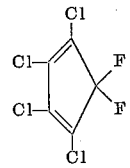

1,2-dichloro-3,4,5,5-tetrafluorocyclopentadiene

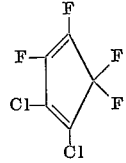

and other halocyclopentadienes such as:

1,2,3,4,5-pentachlorocyclopentadiene

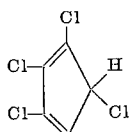

1,3,4-trichloro-2-methoxy-5,5-difluorocyclopentadiene

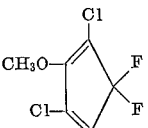

1,1,3-trichloroindene

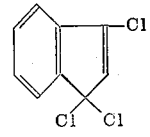

1,1,3-tribromindene

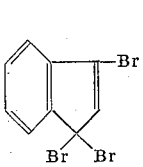

Perchloroindene

9,9-dichlorofluorene

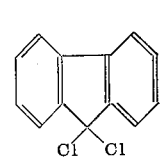

bis(pentachloro-2,4-cyclopentadien-1-yl)

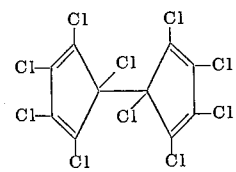

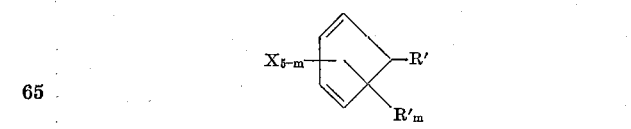

In addition to above enumerated halogen substituted cyclopentadienes, all of which are reported in the literature, other hexahalocyclopentadienes may be used, such as hexafluorocyclopentadiene and hexaiodocyclopentadiene. Useful compounds include other mixed hexahalocyclopentadienes, such as 1,2,3,4-tetrachloro-5,5-dibromocyclopentadiene and 1,2,3,4,5-pentabromo-5-chlorocyclopentadiene and halocyclopentadienes with fewer than six halogen atoms, for example, 5-chloro-cyclopentadiene, 5,5-dichlorocyclopentadiene, 5,5-dibromocyclopentadiene, 1,2,4,5-tetrachloro-3,5-dimethoxycyclopentadiene, 1,2,3-trifluoro-5-chloro-5-methylcyclopentadiene, 1,2,3,4-tetramethyl-5,5-dibromocyclopentadiene, 4-phenyl-5,5-dichlorocyclopentadiene, 9-chloro-bromofluorene, 1-chloroindene, 1,4-dimethoxy-5,5-diiodocyclopentadiene, 1,2,4,5,5-pentafluorocyclopentadiene, 1,2,4,5 - tetrachloro-3,5-bis(methylthio)cyclopentadiene, and 1,2,3,5-tetrachloro-4,5-bis(dimethylamino)cyclopentadiene.

In addition to the above-identified halo-substituted cyclopentadienes, others with from one to three hydrocarbon and substituted hydrocarbon radicals can be used in the preparation of the new sulfides, for example reactants of the structure wherein R' and X are as defined above and wherein m is an integer from zero (0) to two (2), provided that not more than a single R' substituent is on the same carbon atom. Examples of these compounds are 3,4,5-trichloro - 1,2,5 - trimethylcyclopentadiene, 1,4,5,5-tetrachloro-2,3-diphenylcyclopentadiene, 2-benzyl-1,4,5-dichloro-3,5-ethylcyclopentadiene, 2-acetylethyl-1,3,5-trichloro-4,5-dimethylcyclopentadiene, 1,2,4,5,5-pentachloro-3-dimethylaminoethylcyclopentadiene and other cyclopentadienes which have at least one halogen atom on the 5 carbon atom and substituted in the 1,2,3,4 and 5 position the same or different R' substituents as defined above.

Suitable mercaptans are the compounds of the structure

R—SH wherein R may be any hydrocarbon radical containing up to 20 carbon atoms including the alkyl radicals, as in methyl mercaptan, ethyl mercaptan, n-propyl mercaptan, isopropyl mercaptan, t-butyl mercaptan, pentyl mercaptan, dodecyl mercaptan and ethylhexadecyl mercaptan; the alkenyl radicals, as in allyl mercaptan, isopropenyl mercaptan, methallyl mercaptan, crotyl mercaptan, undecenyl mercaptan, octadecenyl mercaptan, piperylenyl mercaptan and sorbyl mercaptan; the alkynyl radicals, as in propargyl mercaptan, tetrolyl mercaptan and octadecynyl mercaptan; the araliphatic radicals as in benzyl mercaptan, phenethyl mercaptan, cinnamyl mercaptan and phenylhexadecyl mercaptan; the hydrocarbon substituted araliphatic radicals, as in 2,4-dimethyl benzyl mercaptan, p-cyclohexylphenethyl mercaptan and p-isopropyl cinnamyl mercaptan; the aryl radicals, as in benzenethiol, 2-naphthalenethiol and p-phenylbenzenethiol; the hydrocarbon substituted aryl radicals, as in 2,4-dimethylbenzenethiol, 2-allyl-1-naphthalenethiol, p-isopropylbenzenethiol and cyclopentylbenzenethiol; the cycloaliphatic radicals, as in cyclohexyl mercaptan, cyclopentyl mercaptan, cyclohexenyl mercaptan, cyclopentenyl mercaptan, cycloheptyl mercaptan and cyclooctyl mercaptan; the hydrocarbon substituted cycloaliphatic radicals, as in phenylcyclopentyl mercaptan, benzylcyclooctyl mercaptan, propylcyclohexyl mercaptan and the dimethyl cycloheptenyl mercaptans; and the said hydrocarbon radicals containing substituents of the group consisting of chlorine, as in 2-chloroethyl mercaptan, 2,4-dichlorobenzenethiol, p-chlorobenzyl mercaptan; bromine, as in 3-bromobutyl mercaptan, 2-bromo-4-chlorobenzyl mercaptan and 2,4,5-tribromobenzenethiol; iodine substituents, as in 2,4,6-triiodo benzyl mercaptan and p-iodobenzenethiol; fluorine, as in trifluoroethyl mercaptan and p-fluorobenzyl mercaptan; the nitro radical, as in m-nitrobenzyl mercaptan; the cyano radical, as in cyanoethyl mercaptan; the isocyano radical, as in 3-cyanoisopropyl mercaptan; the thiocyano radical, as in thiocyanobenzyl mercaptan; the isothiocyano radical, as in p-isothiocyanobenzenethiol and 2-isothiocyanoethyl mercaptan; the hydroxyl radical, as in p-hydroxybenzenethiol and 2,3-dihydroxypropyl mercaptan; the hydrocarbonoxy radical, as in p-methoxybenzenethiol, p-2-decyloxyethyl mercaptan and p-phenoxybenzyl mercaptan; the acyloxy radical, as in the o-acetyloxybenzenethiol; the acyl radical, as in 2-acetylethyl mercaptan and p-butyrylbenzyl mercaptan; the hydrocarbonoxycarbonyl radical, as in hexyloxycarbonylethyl mercaptan, phenoxycarbonylbenzenethiol and methoxycarbonylcyclohexyl mercaptan; the hydrocarbonthio radical, as in 4-ethylthiobutyl mercaptan, 3-phenylthiopropyl mercaptan and cyclohexylthiobenzenethiol; the amino radical, as in p-aminobenzenethiol; the hydrocarbonamino radical, as in dimethylaminoethyl mercaptan, 2-anilinoethyl mercaptan and p-cyclohexylaminobenzyl mercaptan; the hydrocarbon sulfonyl radical, as in o-dodecylsulfonylbenzyl mercaptan, p-phenylsulfonylbenzenethiol, 2-benzylsulfonylethyl mercaptan and p-cyclohexylsulfonylbenzyl mercaptain; the hydrocarbon sulfinyl radical, as in 3(2-ethylhexylsulfinyl)propyl mercaptan, p-phenylsulfinylbenzenethiol and 2-cyclohexylsulfinylpropyl mercaptan; and the heterocyclic radical, as in furfuryl mercaptan, thenyl mercaptan, tetrahydrofurfuryl mercaptan, 2-morpholylethyl mercaptan, p-pyridylbenzenethiol and 3-piperidylpropyl mercaptan.

The reaction between the halocyclopentadiene and the mercaptan is exemplified by hexachlorocyclopentadiene and benzenethiol:

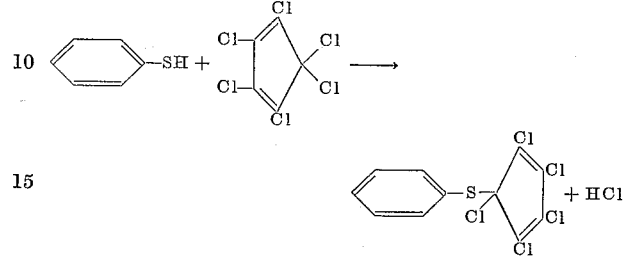

The simple heating of the reactants results in the evolution of hydrochloric acid and the formation of the thio-substituted cyclopentadiene: 1,2,3,4,5-pentachloro-2,4-cyclopentadienyl phenyl sulfide (also called 5-phenylthiopentachlorocyclopentadiene). The reaction can be carried out by the simple contacting of the two reactants at a temperature where the reaction proceeds at a convenient rate. Between benzenethiol and hexachlorocyclopentadiene partners, such a temperature range is between 100 and 200° C. The purely thermal reaction can be readily modified by techniques inducing low temperature free radical mechanisms. Thus, for instance, irradiation (high energy) of the reaction mixture or the addition of radical initiators readily reduce the minimum reaction temperature. Thus, the addition of small amounts of azobis(isobutyronitrile) reduces the threshold temperature to 70–80° C. The reaction is preferentially conducted in a system which provides for the selective elimination of the coproduct hydrochloric acid. This is easily done by allowing the HCl gas to escape while the reactants and the sulfide are retained, possibly with the use of a condenser. The reaction can be conducted both batchwise and in a continuous system at below or above atmospheric pressures. The extent of conversion can readily be followed by determining the amount of the hydrochloric acid released in the conversion. With low boiling mercaptans, it is not necessary to separate the gaseous HCl from the reactants, which may be difficult due to the closeness of boiling points, but the system can be allowed to reach equilibrium and eliminating the gaseous products at the end of the reaction or reaction zone. Further details of the preparation and separation of the novel products are set forth in the specific examples. The new structures have characteristic infrared and ultraviolet absorption spectra suitable for their characterizations. They also can be characterized by the preparation of sulfoxide and sulfone derivatives.

The halo-substituted cyclopentadienyl sulfides are not only valuable chemical intermediates for the preparation of more complete structures comprising sulfoxides, sulfones, Diels-Alder adducts and the like, but possess per se useful properties rendering them of interest as herbicides, insecticides, anti-microbial agents, fungicides, nematicides and as oil additives.

Example I

To a three-neck flask, provided with stirrer, reflux condenser and immersion thermometer, there was charged 136 g. (0.5 mole) hexachlorocyclopentadiene and 26 g. (0.23 mole) of benzenethiol. The mixture was heated to 130° C. and kept between 130 and 140° C. for a period of 3.5 hours. The interaction was indicated by the copious evolution of hydrochloric acid, which, during the above period, amounted to 0.21 mole or 90% of the theory. Workup of the brown but clear reaction mixture by distillation of the excess of hexachlorocyclopentadiene yielded, after the separation of some diphenyl disulfide by-product, 1,2,3,4,5-pentachloro-2,4-cyclopentadien-1-yl phenyl sulfide in the form of an orange oil which had $n_D^{25}$ 1.6280. Calculated for $C_{11}H_5Cl_5S$ (mol. wt. 346.5): Cl, 51.2; S, 9.2%. Found: Cl, 52.4; S, 8.8%.

*Example II*

The procedure of Example I was repeated with 409 g. of $C_5Cl_6$ and 83 g. of benzenethiol at 124–133° C. during a 7 hour reaction period. A greater than 50% yield of 1,2,3,4,5-pentachloro-2,4-cyclopentadien-1-yl phenyl sulfide was obtained as an orange oil.

*Example III*

The procedure of Example I was repeated except that the equivalent amount of p-chlorobenzenethiol was substituted for benzenethiol and the duration of the reaction was extended to 5.5 hours. Workup yielded 1,2,3,4,5-pentachloro-2,4-cyclopentadien-1-yl p-chlorophenyl sulfide, $n_D^{25}$ 1.6298. Calculated for $C_{11}H_4Cl_6S$ (mol. wt. 380.95): Cl, 55.8; S, 8.4%. Found: Cl, 56.6; S, 7.6%.

*Example IV*

The procedure of Example I was repeated except that the equivalent amount of pentachlorobenzenethiol was substituted for benzenethiol and the reaction temperature was raised to 140–165° C. Workup of the resulting reaction slurry yielded, after the separation of bis(pentachlorophenyl)disulfide, substantial amount of 1,2,3,4,5-pentachlorocyclopentadienyl pentachlorophenyl sulfide in the form of a crystalline product.

*Example V*

The procedure of Example I was repeated except that the equivalent amount of p-toluenethiol was substituted for benzenethiol. Workup yielded 1,2,3,4,5-pentachloro-2,4-cyclopentadien-1-yl p-toluene sulfide.

*Example VI*

The use of an aliphatic mercaptan is illustrated with n-hexyl mercaptain, which, when substituted in equivalent amount for benzenethiol in Example I, yielded 1,2,3,4,5-pentachlorocyclopenta-2,4-dien-1-yl n-hexyl sulfide, $n_D^{25}$ 1.5583.

*Example VII*

The use of a tertiary mercaptan is illustrated with tert-butyl mercaptan, which, when substituted in equivalent amount for benzenethiol in Example I, yielded tert-butyl pentachloro-2,4-cyclopentadien-1-yl sulfide in the form of an orange-yellow oil, $n_D^{25}$ 1.5751.

*Example VIII*

The procedure described in Example I was repeated except that 5-ethylpentachlorocyclopentadiene was substituted for hexachlorocyclopentadiene. The reaction product, identified as ethyltetrachlorocyclopentadienyl phenyl sulfide was obtained in the form of an orange oil, $n_D^{25}$ 1.6005.

*Example IX*

The reaction between 5-dodecylpentachlorocyclopentadiene and dodecyl mercaptan yielded, at 140–150° C. and for 5 hours, dodecyltetrachlorocyclopentadienyl dodecyl sulfide in the form of a viscous yellow oil.

*Example X*

Substituting hexabromocyclopentadiene for hexachlorocyclopentadiene of Example I yielded pentabromocyclopentadienyl phenyl sulfide as an amber colored viscous oil.

*Example XI*

The heating of bis(pentachloro-2,4-cyclopentadien-1-yl) with benzenethiol, in a 1:2 molar ratio, at 140–150° C. for 5 hours, yielded bis[tetrachloro(phenylthio)cyclopentadienyl] as a brown semi-solid product.

*Example XII*

The effect of free-radical initiators on the lowering of the reaction temperature is illustrated with the use of azobis(isobutyronitrile), which, when added in catalytic amounts to the mixture of reactants described in Example II, resulted in the quantitative evolution of hydrochloric acid at 75–80° C. in 7.5 hours and in the formation of 1,2,3,4,5-pentachloro-2,4-cyclopentadien-1-yl phenyl sulfide, $n_D^{25}$ 1.6285, in better than 70% yield.

*Example XIII*

The compound of Example I was studied to determine its utility in the control of pathogenic fungi in soil. Sterile soil was inoculated with *Pythium ultimum* and planted with sugar beet seeds. The surface of the soil was drenched with 30 parts per million (based on soil wt.) and then incubated for 56 to 60 hrs. at 65–70° F. in a 100 percent relative humidity atmosphere. There was no damage to the seedlings and no evidence growth of the pathogen.

The same test was repeated with the soil fungus *Rhizoctonia solani* in the presence of cotton seeds. No injury to seeds occurred and there was no growth of the fungus.

*Example XIV*

The compound of Example III was studied to determine its ability to control skin bacteria. At concentrations up to one part per 100,000 it inhibited the growth of *Staphylococcus areus*. Its use as a soap bacteristat was evident.

Although the above description of the invention is written with reference to specific embodiments, these are not entended to limit the scope of the invention. Other modifications will be apparent to those skilled in the art and can well be made without departing from the spirit of concept.

The embodiments of the invention in which an exclusive property or privilege is claimed are defined as follows:

1. The method of preparing a compound of the structure

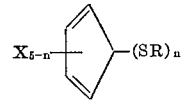

wherein X is a halogen atom; wherein R is a hydrocarbon radical of up to 20 carbon atoms; and wherein n is an integer from one to two; which comprises heating hexahalocyclopentadiene and the mercaptan HSR at a temperature between 100° C. and 200° C. until the evolution of HCl has subsided.

2. The method of preparing a compound of the structure.

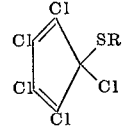

wherein R is a radical of up to 20 carbon atoms selected from the group consisting of alkyl, phenyl, chlorine substituted phenyl and alkyl substituted phenyl, which comprises heating hexachlorocyclopentadiene with a mercaptan selected from the group consisting of alkyl, phenyl mercaptan, alkyl substituted phenyl mercaptan and chloro-substituted phenyl mercaptan, at a temperature such that hydrochloric acid is evolved and continuing the heating until the evolution of HCl has subsided.

3. The method of preparing 1,2,3,4,5-pentachloro-2,4-cyclopentadienyl phenyl sulfide which comprises heating hexachlorocyclopentadiene with phenyl mercaptan at a temperature between 100° C. and 200° C.

4. The method of preparing 1,2,3,4,5-pentachloro-2,4-cyclopentadienyl p-chlorophenyl sulfide which comprises heating hexachlorocyclopentadiene with p-chlorophenyl mercaptan at a temperature between 100° C. and 200° C.

5. The method of preparing 1,2,3,4,5-pentachloro-2,4-cyclopentadienyl p-tolyl sulfide which comprises heating hexachlorocyclopentadiene with p-tolyl mercaptan at a temperature between 100° C. and 200° C.

6. The method of preparing 1,2,3,4,5-pentachloro-2,4-cyclopentadienyl n-hexyl sulfide which comprises heating hexachlorocyclopentadiene with n-hexyl mercaptan at a temperature between 100° C. and 200° C.

7. The method of preparing 1,2,3,4,5-pentachloro-2,4-cyclopentadienyl n-dodecyl sulfide which comprises heating hexachlorocyclopentadiene with n-dodecyl mercaptan at a temperature between 100° C. and 200° C.

References Cited in the file of this patent

UNITED STATES PATENTS

| | | |
|---|---|---|
| 2,870,163 | Davis et al. | Jan. 20, 1959 |
| 2,870,216 | Sorensen et al. | Jan. 20, 1959 |

FOREIGN PATENTS

| | | |
|---|---|---|
| 617,543 | Germany | Sept. 24, 1933 |

OTHER REFERENCES

Reid: Organic Chemistry of Bivalent Sulfur, vol. II, pages 28 and 29 (1960 Edition).